United States Patent [19]
Tanaka et al.

[11] Patent Number: 5,465,999
[45] Date of Patent: Nov. 14, 1995

[54] INFLATABLE SEAT BELT HAVING DEFINED SHAPE

[75] Inventors: Yoshihiko Tanaka, Tokyo; Tsuneo Chikaraishi, Hikone; Nobuya Osada, Kouga, all of Japan

[73] Assignee: Takata Corporation, Tokyo, Japan

[21] Appl. No.: 269,367

[22] Filed: Jun. 30, 1994

[51] Int. Cl.⁶ .................................................. B60R 21/18
[52] U.S. Cl. ............................................................ 280/733
[58] Field of Search .............................. 280/733, 728 R, 280/729, 743 R

[56] References Cited

U.S. PATENT DOCUMENTS

| | | | |
|---|---|---|---|
| 3,841,654 | 10/1974 | Lewis | 280/733 |
| 3,866,940 | 2/1975 | Lewis | 280/733 |
| 3,888,503 | 6/1975 | Hamilton | 280/733 |
| 3,929,348 | 12/1975 | Lawwill | 280/733 |
| 3,970,329 | 7/1976 | Lewis | 280/733 |
| 4,348,037 | 9/1982 | Law et al. | 280/733 |

FOREIGN PATENT DOCUMENTS 1-83436  3/1989  Japan ..................................... 280/733

*Primary Examiner*—Karin L. Tyson
*Attorney, Agent, or Firm*—Kanesaka & Takeuchi

[57] ABSTRACT

An inflatable seat belt apparatus is formed of an inflatable portion which is usually maintained in a band shape and has an envelope part inflated and deployed in a spindle shape by introducing a gas generated by a gas generating device, the gas generating device acting in case of exceeding a predetermined threshold, a webbing having the inflatable portion extending over at least a range directly contacting with an occupant, a tongue fixed to an end of the inflatable portion and having a gas inlet from the gas generating device inside thereof and a buckle which detachably engages the tongue. The envelope part is made of a knitted fabric expanded in the weft direction in a range of contacting the chest of the occupant when the envelope part is inflated. The inflatable seat belt apparatus includes an inflation restricting device for restricting the expansion in the weft direction besides the range.

7 Claims, 8 Drawing Sheets

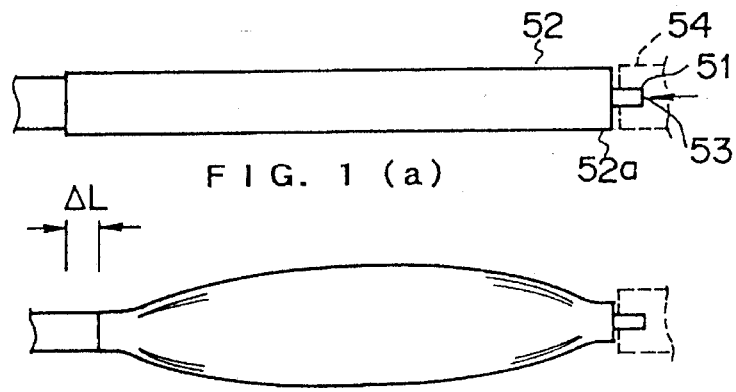
FIG. 1(a)
FIG. 1(b)
PRIOR ART
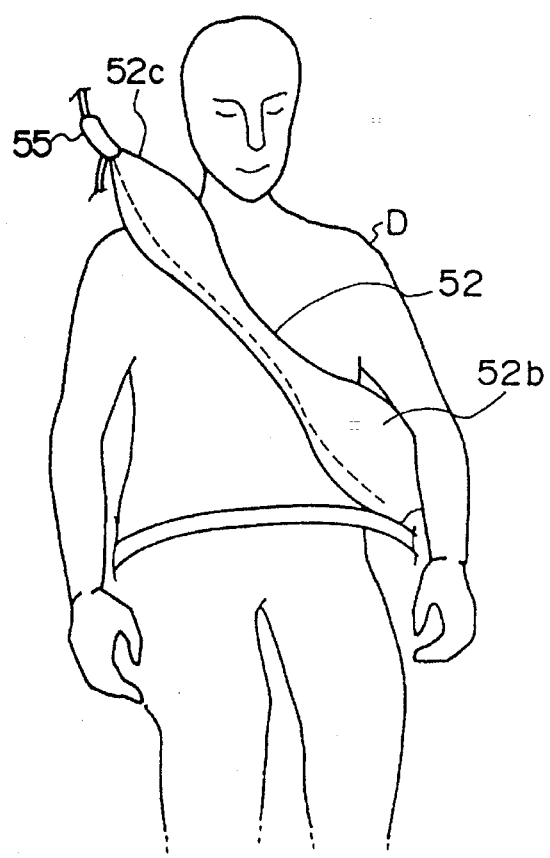
FIG. 2
PRIOR ART

INFLATABLE SEAT BELT HAVING DEFINED SHAPE

BACKGROUND OF THE INVENTION

The present invention relates to an inflatable seat belt apparatus, more particularly to an inflatable seat belt, wherein a webbing of a seat belt apparatus to restrain an occupant has an inflatable portion formed in an envelope shape which is usually maintained in a band shape and is inflated, in an accident, in a predetermined shape with gas spouted from a gas generating means.

Presently, a seat belt apparatus is necessary for a vehicle or the like as an apparatus for securing an occupant's body, which restrains the occupant from sudden movement by a deceleration and an impact in a crash.

Such a seat belt apparatus comprises a webbing as a woven belt made of a fabric which has approximately a 50 mm width and is formed according to Japanese Industrial Standard, to have a retractor (hereinafter referred to ELR: Emergency Locking Retractor), a buckle, a tongue, an anchor and so on.

The ELR winds the webbing by a winding force of a spring and locks the webbing from withdrawing only at a crash so as to restrain the occupant. The buckle is mounted on a suitable position near a floor so that the webbing fits the occupant's body well.

Conventionally, the seat belt apparatus locks the webbing from withdrawing by the function of ELR at a crash to restrain the occupant from a forward movement.

For improvement in the efficiency of restraining the occupant, each of U.S. Pat. Nos. 3,841,645, 3,865,398, and 3,866,940 discloses a seat belt apparatus in which the webbing has a portion formed in an envelope shape and is folded like bellows. The portion is provided with a weak adhesive so as to usually maintain in a band shape, or the folded portion is held in the band shape by fastening means such as a fastener, so that in a crash, the portion formed in the envelope shape is inflated and deployed by a spouted gas from a gas generator connected to the webbing.

According to the seat belt apparatus having the inflatable portion formed in an envelope shape (hereinafter, it is called as "an inflatable seat belt apparatus"), force applied to the occupant can be distributed over the range wider than the conventional webbing so as to decrease the stress applied to the occupant and a higher safety efficiency can be provided.

The inflatable seat belt apparatus is effective even for a rear seat. For mounting an air bag apparatus for an occupant on the rear seat, the air bag apparatus is generally mounted on the rear side of the back portion of the front seat. It is necessary that the front seat structure has a high rigidity for suitably operating the air bag apparatus for the rear seat to efficiently restrain and secure the occupant. However, it is difficult to provide the reclining mechanism having a movable portion to the front seat if the air bag apparatus is mounted on the rear side of the back portion of the front seat. Therefore, the inflatable seat belt apparatus is effective for the rear seat because the inflatable seat belt apparatus can be independently mounted on the rear seat and has no restriction such as the above mentioned air bag apparatus.

In such an inflatable seat belt apparatus, wherein the envelope shaped portion is folded to form a band shaped belt having a predetermined width as mentioned above, the folded envelope shaped portion is piled up to be thickened. Therefore, the belt is hard to fit the occupant's body during wearing and hard to pass smoothly a slip guide of a pillar anchor. Accordingly, there is a fear of decreasing the belt wearing rate because the occupant feels an incongruity during wearing.

Further, the folded portions are glued together and therefore, the inflatable portion is hard to deploy smoothly even when the spouted gas is introduced into the envelope shaped portion during the deployment.

Therefore, the applicant has already proposed an inflatable seat belt apparatus which can overcome these problems (Japanese Patent Application No. 210353/1992, 210355/1992).

These applications disclose inventions that the envelope shaped portion is structured by a knitted fabric member, i.e. a woven textile member having wefts which expands enough.

According to these inventions, the seat belt apparatus is maintained in a relatively thin band shape and can inflate and develop the envelope shaped portion reliably and promptly at an emergency.

FIG. 1 (a) shows an example of the inflatable seat belt apparatus, wherein one portion of a shoulder belt is structured by a cylindrical knitted fabric member.

And a rubber tube formed in an envelope shape is inserted into the cylindrical knitted fabric member.

In this figure, numeral 51 designates a tongue. The tongue 51 has a gas inlet 53 for introducing gas into the rubber tube in a belt 52 inside thereof. The gas inlet 53 is coupled to a gas outlet of gas generating means, i.e. gas generator (not shown), connected inside a buckle 54 when the tongue 51 is engaged with the buckle 54 for fixing a belt end 52a to the vehicle body.

FIG. 1 (b) shows an example of a state where a predetermined gas pressure is applied to the belt portion of the inflatable seat belt apparatus structured as stated above.

As shown in this figure, the rubber tube is inflated by the gas pressure in the tube. And a whole shape of the rubber tube is defined by the envelope shaped knitted fabric member wrapping the tube and is inflated in a spindle shape. Because the area of the belt portion touching the chest and the like of the occupant is increased, an impact applied to the occupant is softened and the apparatus can protect the occupant efficiently.

Because the inflatable portion formed in an envelope shape is radially increased, the length of the belt in a longitudinal direction is shortened by $\Delta L$. Therefore, the inflatable seat belt apparatus has a function as a pre-tensioner so that the occupant is more effectively retained.

However, the following problems become apparent from various tests using a model and a real vehicle for the inflatable seat belt apparatus as mentioned above. The tests are executed by using a full-sized dummy.

As shown in FIG. 2, the knitted fabric structural portion of the shoulder belt 52 is effectively inflated and deployed in a crash.

When the belt tries to restrain the dummy D from movement, the gas in the tube escapes to a space 52b between the buckle near the floor and the waist of the dummy D and to a space 52c between a pillar anchor 55 and the shoulder of the dummy D, so that the shoulder belt 52 is inflated in a gourd shape. In this state, the shoulder belt 52 can not be inflated over an enough area at the important place for catching the chest of the dummy D. This spoils the merit of using an inflatable structure for the shoulder belt.

Because the tube is inflated in the whole extent of the longitudinal direction thereof, the inflation volume becomes large and then the gas pressure in the tube is hard to be increased. In addition, because the tube can not be inflated enough in the radial direction thereof, the length of the belt in the longitudinal direction is not shorted enough. Therefore, the above mentioned function as a pre-tensioner does not work effectively.

Furthermore, the above mentioned inflatable seat belt apparatus has various inconveniences. In the inflatable seat belt apparatus, the envelope shaped portion of the shoulder belt is also wound in an ELR mounted in the under portion in the pillar. The belt portion formed of the knitted fabric is slightly thicker than the belt portion formed of the fabric textile. Therefore, the ELR should be exchanged for a special ELR which can accommodate the thick belt formed of a knitted fabric.

A slip guide is mounted to the pillar anchor to change the direction of the belt withdrawn form ELR. The slip guide has a guide opening for the belt. The width of the guide opening is narrow for preventing the belt from twisting and turning over. Therefore, it is hard to allow the thick belt to smoothly pass therethrough.

On the other hand, in case that the belt is formed to have a short width, the occupant feels the belt is undependable. The belt must maintain its stiffness and its form which give dependence to the occupant when the occupant uses the belt.

It should be considered to prevent the surface of the knitted fabric from abrasion.

SUMMARY OF THE INVENTION

It is therefore an object of the present invention to overcome the above mentioned problems of the prior art and to provide an inflatable seat belt apparatus maintaining a proper inflation shape and an internal pressure therein when the apparatus restrains the occupant from movement during deployment.

Furthermore, the inflatable seat belt apparatus fits an occupant's body well and has enough durability even if the apparatus is used repeatedly.

For accomplishing the above mentioned object, a first invention provides an inflatable seat belt apparatus comprising an inflatable portion which is usually maintained in a band shape and has an envelope part inflated and deployed in a spindle shape by introducing a gas generated by gas generating means, the gas generating means actuating in case of exceeding a predetermined threshold, a webbing having the inflatable portion extending over at least a range directly contacting with an occupant, a tongue fixed to an end of the inflatable portion and having a gas inlet for receiving the gas from the gas generating means, and a buckle detachably engaging the tongue, wherein the envelope part is made of a knitted fabric, and the knitted fabric is expandable in the weft direction in a range of contacting the chest and around the chest of the occupant when the envelope part is inflated, while the inflatable seat belt apparatus includes inflation restricting means for restricting the expansion in the weft direction besides the range. Therefore, the inflatable seat belt apparatus can restrain the occupant form movement with a wide contacting area around the chest of the occupant. Further, the pressure in the inflatable portion can be increased because the volume of the inflation is minimized and the webbing is shortened certainly in the longitudinal direction. Therefore, the function as a pre-tensioner is effectively provided to restrict the occupant more effectively.

The second invention provides an inflatable seat belt apparatus comprising an inflatable portion having an envelope part formed over a range of connecting an occupant and usually maintained in a band shape, the envelope part being inflated and deployed in a rough spindle shape by introducing a gas generated by gas generating means thereinto in case of exceeding a predetermined threshold, a webbing having one end fixed to the inflatable portion and the other end accommodated in winding means by winding, a tongue fixed to a distal end of the inflatable portion and having a gas inlet for receiving the gas from the gas generating means, and a buckle detachably engaging the tongue, wherein the envelope part is made of a knitted fabric, and the knitted fabric is expandable in the weft direction in a range of contacting the chest and around the chest of the occupant when the envelope part is inflated, while the inflatable seat belt apparatus includes inflation restricting means for restricting the expansion in the weft direction besides the range.

Therefore, the inflatable portion can become thinner so that the inflatable seat belt apparatus becomes useful. As well as the first invention, the inflatable seat belt apparatus can restrain the occupant from movement with a wide contacting area around the chest of the occupant. Further, the pressure in the inflatable portion can be increased because the volume of the inflation is minimized and the webbing is shortened certainly in the longitudinal direction. Therefore, the function as a pre-tensioner is effectively provided to restrict the occupant more effectively.

In the above inventions, preferably, the inflation restricting means comprises a cylindrical cloth cover having a connecting portion extending in the longitudinal direction thereof, the cylindrical cloth cover being formed to cover the envelope part. The connecting portion comprises a first part corresponding to the chest and of the occupant and a second part, the first part being broken away by a pressure in the envelope part during the inflation and deployment, and the second part being maintained without break even during the inflation and deployment. Therefore, the inflation shape and inflation volume of the inflatable portion during the inflation and deployment thereof can be easily controlled. In addition, the envelope part is effectively protected during wearing and so on and the durability of the belt portion constructing the inflatable structural portion is improved.

Preferably, the connecting portion is formed by seaming.

Furthermore, preferably, the envelope part is formed by a tubular knitted textile.

In the first invention, preferably, the webbing has an end fixed to the tongue with the inflatable portion and the other end accommodated in winding means by winding, the inflatable portion extending over at least a range directly contacting with an occupant to wrap the webbing as a core thereof.

In the above mentioned inventions, preferably the inflatable portion has a tubular inflatable member inserted thereto, the tubular inflatable member being inflatable by introducing a gas.

Preferably, the inflation restricting means has an inflation restricting part disposed on the surface of the tubular inflatable member, so that an inflation of the envelope part is restricted by restricting an inflation shape of the tubular inflatable member.

BRIEF DESCRIPTION OF THE DRAWINGS

FIGS. 1 (a), and 1 (b) are explanatory views showing an example of inflation shapes of a conventional inflatable seat belt apparatus having an inflatable member structured by a knitted fabric;

FIG. 2 is a perspective view simply showing a result of tests using a dummy, wherein the inflatable seat belt apparatus as shown in FIG. 1 is inflated and deployed;

DETAILED DESCRIPTION OF THE PREFERRED EMBODIMENTS

An embodiment of an inflatable seat belt apparatus according to the present invention is now described referring to the attached drawings.

Figure 3:
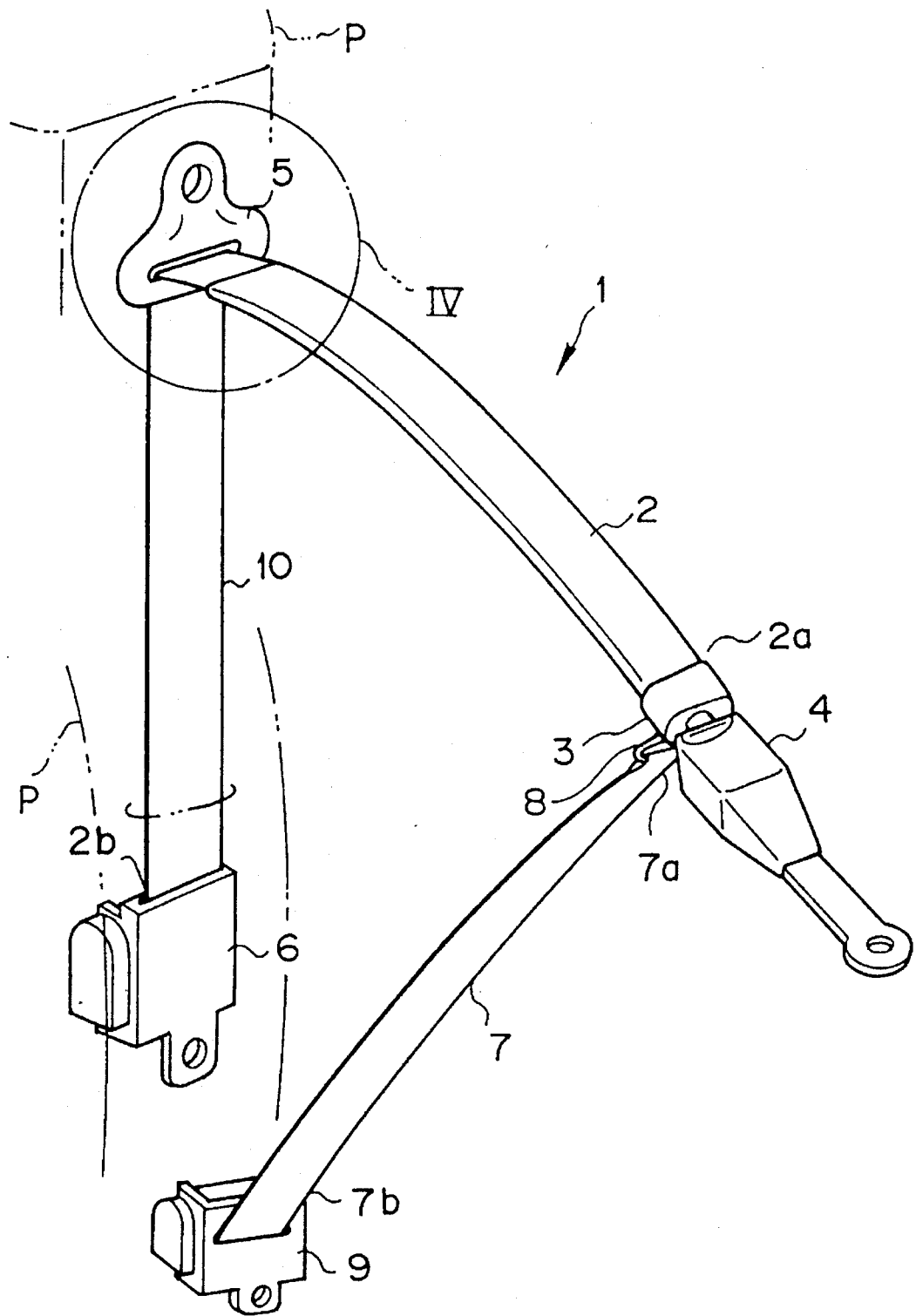
FIG. 3 is a simplified perspective view showing an embodiment of an inflatable seat belt apparatus according to a first invention.

FIG. 3 is a simplified perspective view showing a whole structure of the inflatable seat belt apparatus 1. This figure illustrates for clarifying relationships among respective components of the inflatable seat belt apparatus applied to the right side front seat.

In this figure, numeral 2 designates a shoulder belt. The shoulder belt 2 has an end 2a to which a tongue 3 is fixed. The shoulder belt 2 is engaged and fixed to a buckle 4 mounted on a predetermined position of the floor between the right and left front seats via the tongue 3. The shoulder belt has the other end 2b downwardly guided through a slip guide 5 of a pillar anchor (not shown) mounted on a pillar P. The pillar anchor is adjustable in upper and lower directions. The shoulder belt is thus hung from the slip guide 5 to be wound up in an ELR 6 arranged near the floor.

A lap belt 7 has an end 7a fixed to an anchor plate 8 fixed to a mouthpiece of the tongue 3 and has the other end 7b wound in the ELR 9 mounted on the floor at the door side beyond the seat cushion.

The description will now be made as regard to details of the structures of the shoulder belt, peripheral components of the tongue, and the buckle, respectively.

The shoulder belt 2 comprises the end 2b wound and accommodated in the ELR 6, the other end 2a connected to the tongue 3, and a piece of webbing 10 as a through member as shown in FIG. 3. In this embodiment, for the webbing 10, a band shaped belt having a 50 mm width and a 1.6 mm thickness which is tightly woven by twilling, plain weaving or the like by using polyester finished yarn is employed. The webbing 10 is equivalent to one of a conventional seat belt apparatus. The webbing 10 has a section between an abdominal region and a right shoulder region which directly touches the body of an occupant wherein the section has a portion covered by a cylindrical cover 20 made of a cloth and formed to have a slight thickness.

In the inside of the portion having the slight thickness, several kinds of envelope shaped members are accommodated overlappingly.

Figure 4:
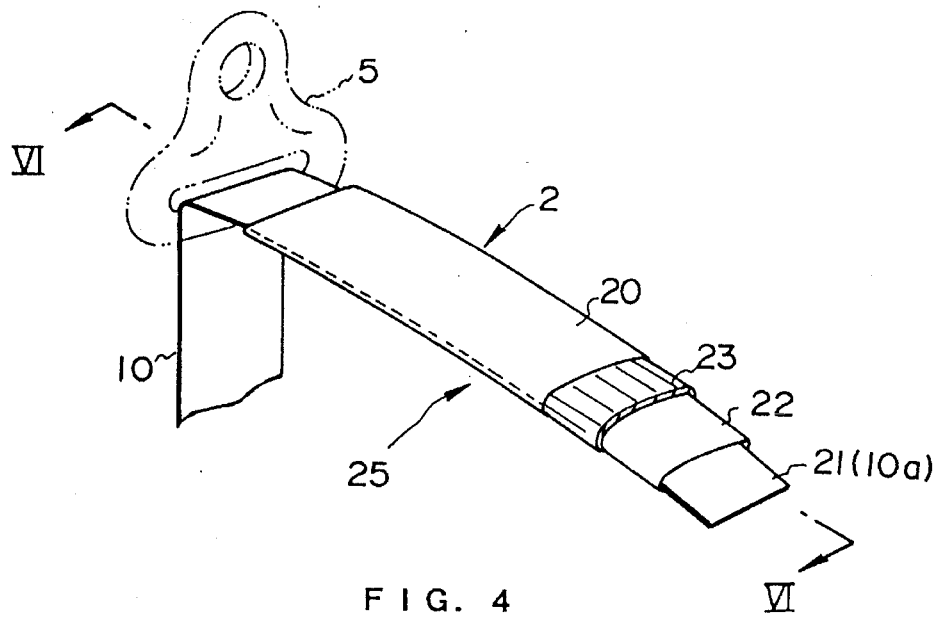
FIG. 4 is a perspective partial view magnifying and exemplifying the inside of the inflatable portion when an occupant usually wears the inflatable seat belt apparatus shown in FIG. 3.

In FIG. 4, numeral 10a shows the webbing 10 positioned within the cover 20. Because of the difference of the functions, this portion of the belt is called an inner belt 21, the portion of the belt which is exposed outside and is wound into the ELR is called the webbing 10, and these portions are designated by the different numerals 10 and 21, respectively.

Figure 6:
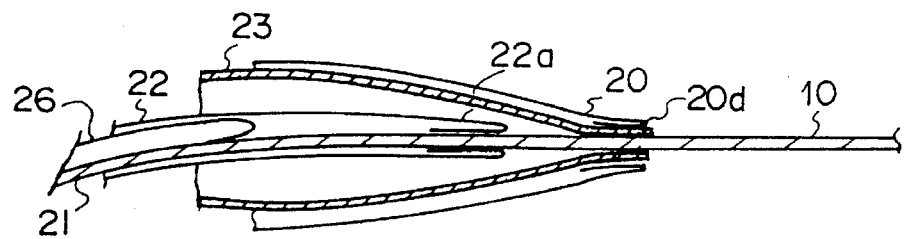
FIG. 6 is a longitudinal sectional view showing a structure of a slip guide side of the inflatable portion.

The inner belt 21 is inserted in a flat condition into a tube 22 formed of a thin film and made of silicone rubber as shown in FIG. 4. The tube 22 made of silicone rubber is cylindrical and has an end 22a sealingly fixed to a predetermined position of the inner belt 21 as shown in FIG. 6. Therefore, the tube 22 is inflated in a long and slender cylindrical shape as a gas is introduced into the tube 22.

This tube 22 is accommodated in a cylindrical knitted textile member 23 of flat type which is knitted in a size slightly larger than the tube 22. In this embodiment, the knitted textile member 23 is constituted by a tubular knitted textile using a polyester finished yarn (1500 denier). The knitted textile member 23 of the tubular knitted textile has a characteristic which does not expand in the longitudinal direction of the belt (wrap direction of the knitted fabric) and is easily expandable in a direction (weft direction of the knitted fabric) that the circumference of the cylindrical shape is increased.

The cloth cover 20 as described above is arranged to wholly cover the knitted textile member 23 of a cylindrical shape, and the knitted textile member 23 and the cover 20 are firmly sewn together with the inner belt 21 as shown in FIG. 6.

Preferably, a material for the cover 20 does not show a crease and is soft in touching because the cover 20 is a portion directly touched with the hand of the occupant and directly contacts with the clothe of the occupant. In this embodiment, a tricot knit fabric knitted by warp knitting with a polyester finished yarn is employed for the cover 20.

The thick portion has the inflatable tube 22 with the inner belt 21 as a core, and the end is connected to the gas generator via the tongue 3 so as to be inflated and deployed by the gas introduced in a very short period of time at a crash. Therefore, the inflatable seat belt apparatus can efficiently restrain the occupant from movement. In this specification, "inflatable portion" will be denoted instead of a whole set of the inflatable member hereinafter.

In addition to the embodiment described above, this invention may be accomplished by the following embodiments having modified components of the inflatable structural portion.

For the tube 22, a rubber material which has high elasticity even against a rapid inflation and has heat-resistance because the high temperature gas is filled in the inside of the tube 22 is suitable for using. The material having rubber-like elasticity may be used for the tube 22. The material may be, for example, various kinds of thermoplastic elastomer, urethane rubber, fluorocarbon rubber, blended rubber or the like.

The knitted textile member 23 is the tubular knitted textile of wefts having no seam for forming a cylindrical shape in the above mentioned embodiment. The stitch may be plain stitch, rib stitch, pearl stitch, interlock stitch or the like. In this case, the elongation of the knitted textile member 23 in the weft direction is changeable by converting density of knitted loops into the wrap direction.

The knitted fabric of a flat type is made by plain weave. In this case, it is possible that two sheets of the knitted fabrics in a long and slender shape are overlapped and the ends of the knitted fabrics are sewn together to make a cylindrical form, and that both ends of one sheet of the knitted fabric are sewn together to make a circular form.

A cloth employed for the cover 20 may be a plain weave fabric using a nylon yarn or polyester yarn.

Besides the materials as described above, other material such as a resin film, an artificial leather or the like is considered to be employed for the cover if the material satisfies the conditions of the feel, the stiffness, the persistence and so on.

Figure 5:
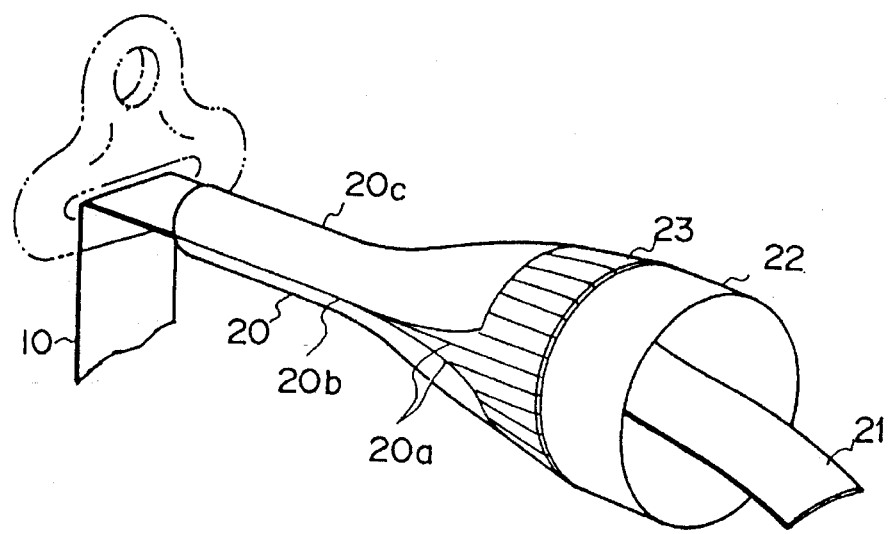
FIG. 5 is a perspective partial view exemplifying the inside of the inflatable structural portion when the inflatable seat belt apparatus shown in FIG. 4 is inflated and deployed.

FIG. 5 is a perspective partial section view for understanding the inside of the inflatable portion shown in FIG. 4 when the inflatable seat belt apparatus is inflated and deployed.

As the tube 22 is inflated by the introduced gas, the knitted textile member 23 constituted by the tubular knitted textile is elongated in the radial direction to be inflated in a cylindrical shape. When the predetermined inner pressure is applied, a portion of the thread sewing together the cloths of the cover 20 is torn. A seam 20a of the cover is then opened like a mouth, and the tube 22 covered by the knitted textile member 23 is inflated in a spindle shape to be forced out from the opening of the seam 20a.

While, because a seam 20b of the cover 20 is sewn firmly at a predetermined range on the pillar anchor side of the inflatable portion 25 and at a predetermined range on the tongue side, the inflation of the tube 22 is limited by a cover portion 20c of the cover 20, so that the cover portion 20c is inflated only in a long and slender cylindrical form. The diameter of the cylindrical form is approximately 3.6 cm in this embodiment.

The length in the longitudinal direction of the belt is shortened because the inflatable portion 25 is inflated in a spindle shape. At this point, because the knitted textile member 23 of the inflatable portion 25 receives a tensile force in the longitudinal direction of the belt, the inner belt 21 does not receive the tensile force so that the inner belt 21 is loose.

FIG. 6 is a sectional view showing the structure of an end of the inflatable portion 25 and the webbing 10 (the webbing 10 is called the inner belt 21 in case that it is located inside the inflatable portion 25 as mentioned above) near a slip guide side.

As the structure is now be described again, the end of the knitted textile member 23 is integrally glued to the end 20d of the cover 20 by the adhesive and is firmly sewn to the webbing 10. The end 22a of the tube 22 made of silicone rubber is glued to the inner belt 21 within the knitted textile member 23 inside of the sewing part.

A cylindrical bag filter 26 is accommodated in the tube 22 to collect cinders such as carbon powder spouted with the high temperature reaction gas.

The bag filter 26 is made of a cloth which is closely woven to be able to collect the high temperature fine cinders and to be able to pass the gas freely. Since the high temperature cinders are adhered to the inner surface of the filter, the material for the filter is preferably a cloth having heat resistance.

The description will now be made as regard to a method for controlling a shape of the inflatable portion 25 fully inflated and the inflatable volume.

Figure 7:
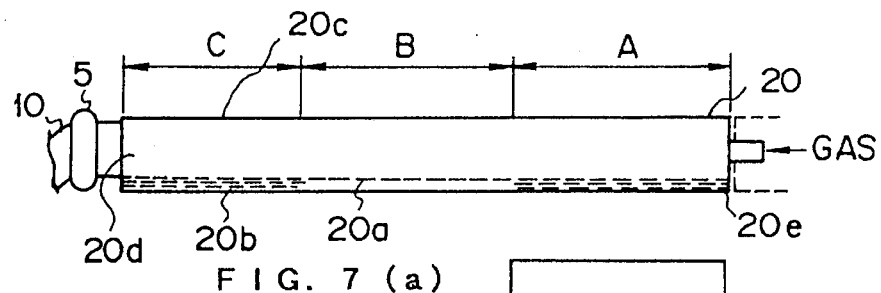
FIGS. 7 (a)–7 (c) are explanatory drawings showing a state of sewing of a cover of the inflatable portion and a state of the inflatable portion restricting the inflation shape by the cover.
Figure 7:
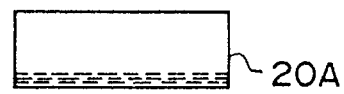
Figure 7:
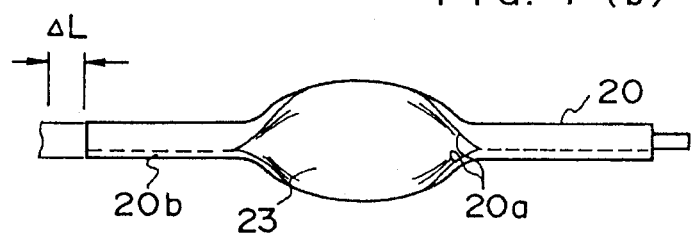

FIG. 7 (a) is a plan view showing the cloth cover 20 used in this embodiment. The cloth cover 20 is made by seaming together the ends of tricot knit fabric having a predetermined size to be a slender cylindrical shape. In this embodiment, a margin for seaming of the inflatable portion 25 is approximately 800 mm in whole length and has a range (A) of approximately 300 mm in length at the tongue side, a range (B) at the middle and a range (c) of approximately 200 mm in length at a slip guide side. The margin is seamed by a fine thread (60 denier) along the whole length once.

Further, the range (A) and the range (c) are seamed by a heavy thread (630 denier) twice. The seam pitch by the heavy thread is closer than the seam pitch by the fine thread. That is, the seamed portion 20a of the range (B) is seamed only by the fine thread. At this stage, the fine thread is so strong that the thread is not broken as the occupant pulls the seam during wearing.

In case of using a thinner cloth for the cover 20, another cover 20A is preferably covered over the range (A) besides the cover 20 as shown in FIGS. 7 (a) and 7 (b) to restrict the cloth of a cover portion 20e of the cover 20 near the tongue 3 from breaking when the gas is introduced into the tube 22 rapidly.

FIG. 7 (c) is an explanatory drawing showing an example of a state that the inflatable portion 25 covered by the cover 20 shown in the same FIG. 7(a) is inflated and deployed by the spouted gas.

First, an impact sensor senses a rapid deceleration over a predetermined threshold at a crash or the like and then outputs an operational signal to the gas generator. Thus, the gas generator generates the gas rapidly. The gas is then spouted to be introduced into the inflatable portion 25 through the gas inlet of the tongue 3. The inflatable portion 25 is rapidly inflated in a long and slender cylindrical shape as a whole. When the gas pressure in the tube 22 is increased to the predetermined gas pressure, the seam 20a of the above mentioned cover 20 is broken to extrude the tubular knitted textile at the range (B) in a spindle shape. As a result of this, the inflatable portion is formed in a shape as shown in FIG. 7 (c) as a whole.

Therefore, the inflation volume of the inflatable portion 25 can be restricted about ⅓ of the inflatable portion without the cover 20 as shown in FIG. 1 which is the same size of the inflatable portion 25. The gas pressure in the inflatable portion 25 is increased since the amount of the gas generated from the gas generator is the same, so that the above mentioned function as a pre-tensioner is exactly provided.

Figure 8:
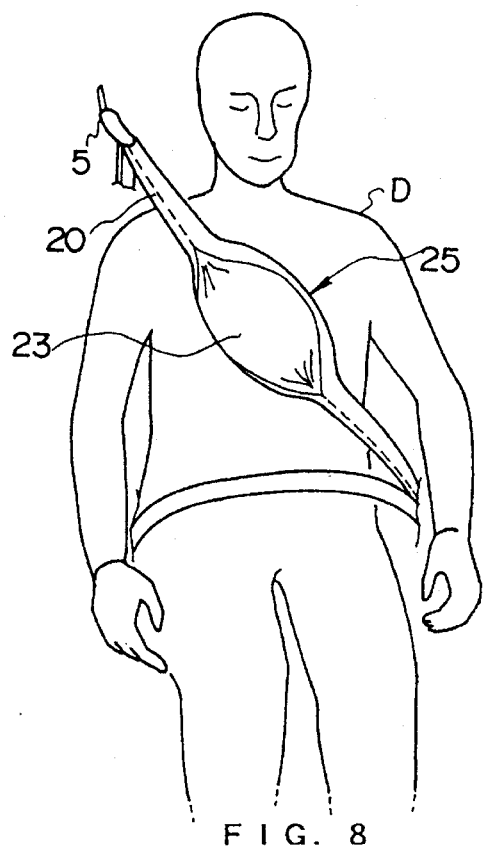
FIG. 8 is a perspective view simply showing a result of tests using a dummy, wherein the inflatable seat belt apparatus of the present invention is inflated and deployed.

FIG. 8 is a simplified perspective view showing a result of tests using a full-sized dummy D which is for testing the inflation and deployment of the inflatable seat belt apparatus according to the present invention.

According to the inflatable seat belt apparatus covered by the cover 20 shown in FIG. 7(a), the inflatable portion 25 is inflated around a chest of the dummy D as the center thereof. At this stage, at the chest of the dummy D, the apparatus can provide the wide area touching the dummy D which is wider by 1.6 times than a seat belt apparatus having a normal webbing 10. Therefore, the inflatable seat belt apparatus can protect the occupant securely and softly.

It should be understood that the seam portion and range for breaking of the cover 20 can be set freely by changing the margin portion for seaming of the cover.

As apparent from FIG. 8, the inflatable portion 25 is inflated in the slender cylindrical shape at the chest, so that the inflatable seat belt apparatus can restrain a portion between the clavicle and the shoulder and a portion between the waist and the hip of the occupant softly as compared with the normal webbing.

The inflatable range of the inflatable portion 25 can be controlled by adjusting the strength for seaming the cover. Thus, the suitable inflation shape and the reduction of the inflatable volume are accomplished.

Though the description is made as regard to the seaming by the thread for joining the cover in the above description, an adhesive strength can be changed by changing the adhesive surface if the joint is provided by adhesion, or a joint strength is controlled by a mechanical joining member and thereby the same effect can be provided.

The description will now be made as regard to altered examples for restricting the inflatable range of the inflatable portion 25 instead of the cover 20 referring to FIGS. 9 (a)–9 (c) and FIG. 10.

Figure 9:
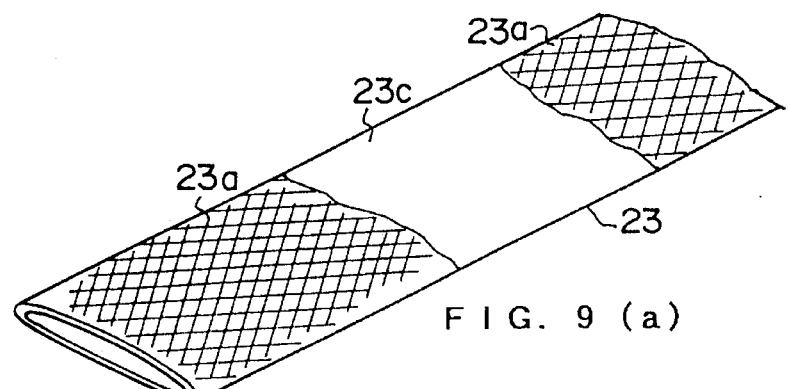
FIGS. 9 (a)–9 (c) are perspective views showing an altered example of a member for restricting an inflation shape of the inflatable portion.
Figure 9:
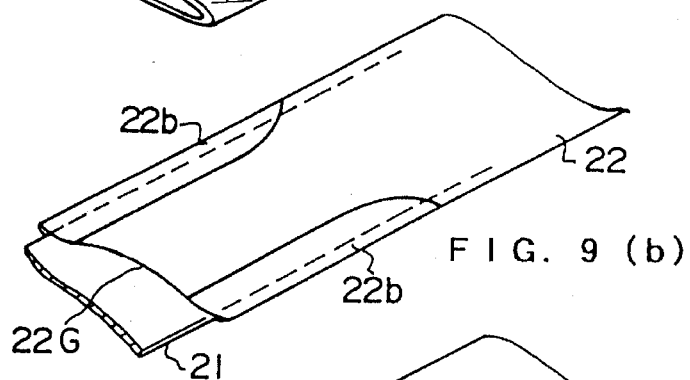
Figure 9:
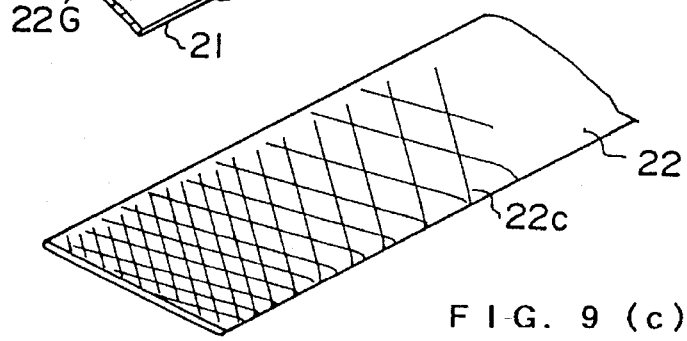

FIG. 9 (a) shows the knitted textile member 23 constituted by a tubular knitted textile. The knitted textile member 23 has a stitched portion which are hardened by impregation of a resin not to expand even if the tube 22 inserted inside thereof is inflated.

A resin coating 23c indicating a weak tackiness is provided onto the knitted textile member 23 so that the stitches of the knitted textile member 23 can not be expanded when the belt is pulled during normal wearing. As the tube 22 is inflated by the introduced gas and then the gas pressure is applied, the adhesive of the resin coating impregnated into the stitches is broken so that the inflatable portion is inflated promptly. Since the both side portions 23a having strong resin coatings are not deformed and remain as they are even when the tube is inflated, only the gas path portion is inflated in a slender cylindrical shape. Also in this altered example, an inflation shape similar to the state shown in FIG. 8 is accomplished.

Further, according to the altered example, the inflatable range can be controlled by the knitted fabric per se and the cover 20 can be omitted since the stitches do not expand during normal wearing because of the weak resin coating.

FIG. 9 (b) shows an altered example in which the inserted inner belt 21 and the end of the tube 22 made of silicone rubber are welded or glued together to form a gas path 22G and the tube 22 is inserted into the knitted textile member 23 constituted by a tubular knitted textile so as to construct the inflatable portion 25. Also in this altered example, an inflation shape similar to the state shown in FIG. 8 is accomplished because an inflation shape of the heat sealed or glued side portion 22b of the tube 22 is restricted.

FIG. 9 (c) shows an altered example in which a reinforcing thread 22c is wound spirally around the end of the tube made of silicone rubber to restrict the inflation shape of the wound portion. In this altered example, a polyester finished yarn is employed as the reinforcing thread 22c and is wound around the periphery of the tube 22 with a predetermined pitch and fixed to the surface of the tube by an adhesive or the like. Therefore, the periphery of the tube 22 is not enlarged even when the gas is introduced thereto.

At this stage, the inflation shape of the tube 22 can be freely controlled by changing the winding pitch of the reinforcing thread 22c.

Further, the reinforcing thread may not only be wound around the surface of the tube 22 already manufactured but also buried in the tube 22 to be incorporated with the tube 22 as a core during manufacturing.

Figure 10:
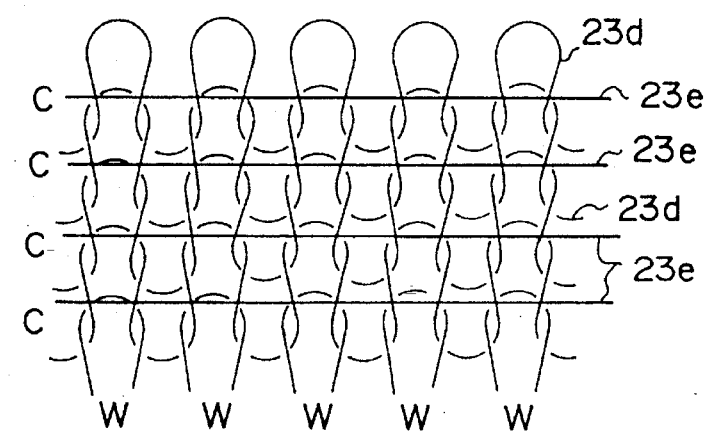
FIG. 10 is a plain stitch pattern showing an altered example of a knitted fabric structure.

FIG. 10 shows an example that the inflation shape of the inflatable portion 25 is controlled by changing the stitch of the tubular knitted textile as another altered example.

FIG. 10 shows an example of plain stitched knit pattern. In such a knitting structure, the warps 23e are inserted besides the wefts at the same intervals as the courses (c) of weft knitted loop 23d or proper intervals relative to the courses (c) so that the inflation shape in the weft direction is controlled. That is, an expanding amount in the lateral direction of the knitted fabric member 23 is freely controlled by changing the number, pitch, size or type of the warp 23e inserted.

It should be understood that the above mentioned method can be applied to another tubular knitted textile such as rib stitch and pearl stitch.

The description will now be made as regard to the detail of the fitting structure between the inflatable portion 25 according to the present invention and tongue 3 having the gas inlet referring to FIG. 11 and FIG. 12.

Figure 11:
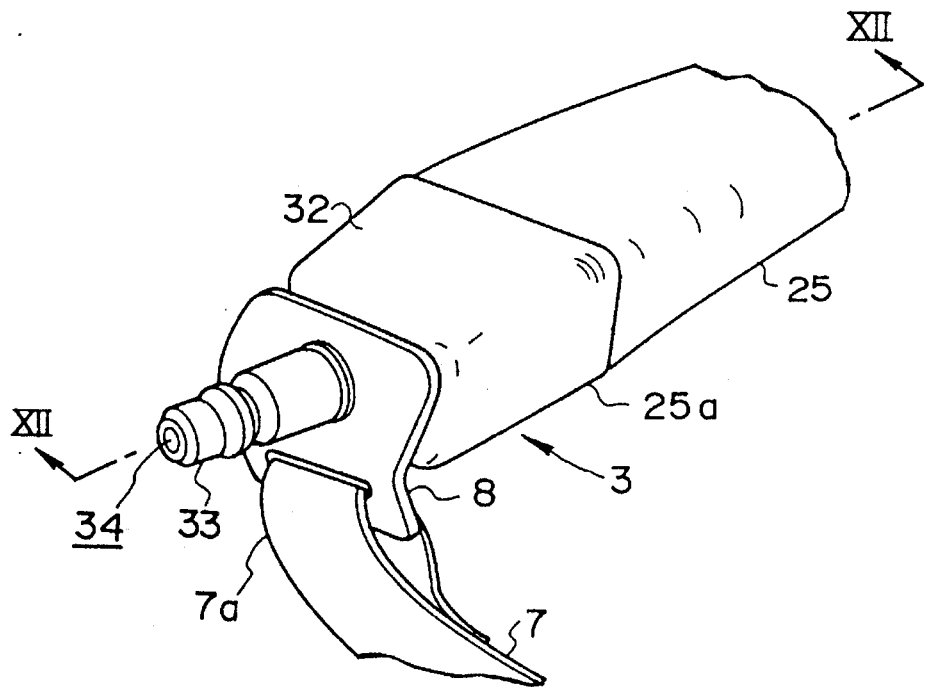
FIG. 11 is a perspective view showing a fitting structure between a tongue and the end of the inflatable portion.

FIG. 11 is a perspective view showing a connecting portion between the tongue 3 and the inflatable portion 25. In FIGS. 11 and 12, the end 25a of the inflatable portion 25 is fixed to cover an end fitting 31 made of metal which has a flat square section. Furthermore, the end 25a is fixed firmly by a caulking fitting 32 so as to cover the periphery thereof, so that the inflatable portion 25 is not easily broken away from the end fitting 31.

The end fitting 31 has a tongue pipe 33 secured to the distal end thereof. The tongue pipe 33 is inserted and engaged to the buckle body of the buckle 4 (not shown). The tongue pipe 33 has a gas path 34 formed inside thereof. The gas from gas generating means (not shown) is introduced into the inflatable portion 25 through the gas path 34 and the inside of the end fitting 31.

The tongue 3 is integrally structured by a combination of the end fitting 31, the caulking fitting 32, and the tongue pipe 33 in this embodiment.

The tongue pipe 33 has a lap belt anchor plate 8 fixed to the bottom part thereof to secure an end 7a of a lap belt 7 as a normal webbing.

Figure 12:
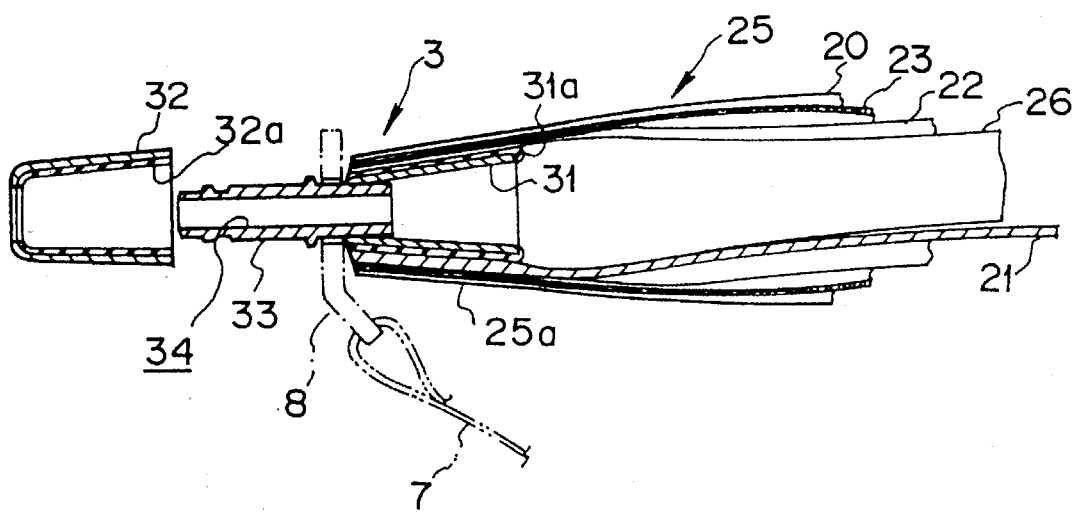
FIG. 12 is a longitudinal sectional view showing a section of the fitting structure taken along a line XII—XII in FIG. 11.

FIG. 12 is a longitudinal sectional view showing a fitting structure for the members of the inflatable portion 25 and the tongue 3.

As shown in FIG. 12, the inner belt 21, the bag filter 26, the tube 22, the knitted textile member 23 and the cover 20, of the inflatable portion 25 are overlapped to the peripheral portion of the end fitting 31 coated by a rubber coating 31a to tightly touch with each other. The caulking fitting 32 having an inside coated by a rubber coating 32a is fixed to the peripheral portion of the inflatable portion (In FIG. 12, the caulking fitting 32 is separated.).

Since the inflatable portion 25 is structured as described above, the inflatable portion 25 is sealingly maintained at the end 25a thereof and a break off or a breakage of the end fitting 31 is not possible even if the reaction gas having high pressure is rapidly introduced into the inflatable portion 25.

Figure 13:
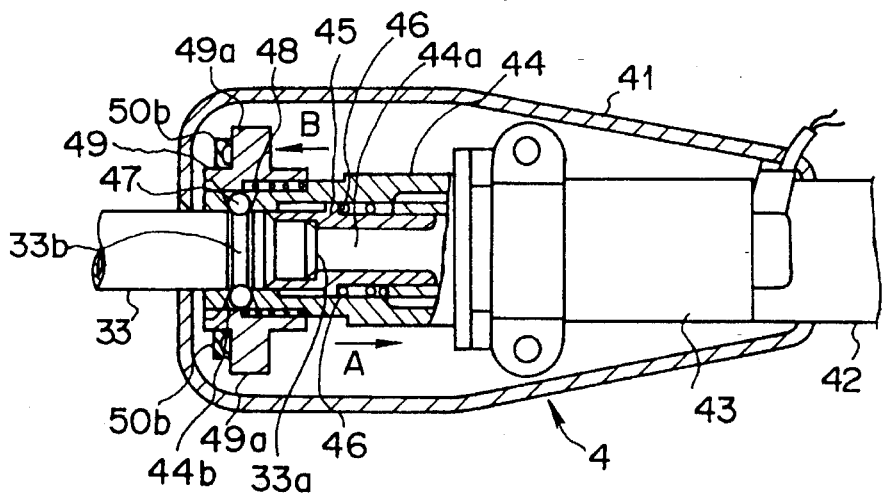
FIG. 13 is a cross sectional view showing a simplified structure of an engaged portion of a buckle.
Figure 14:
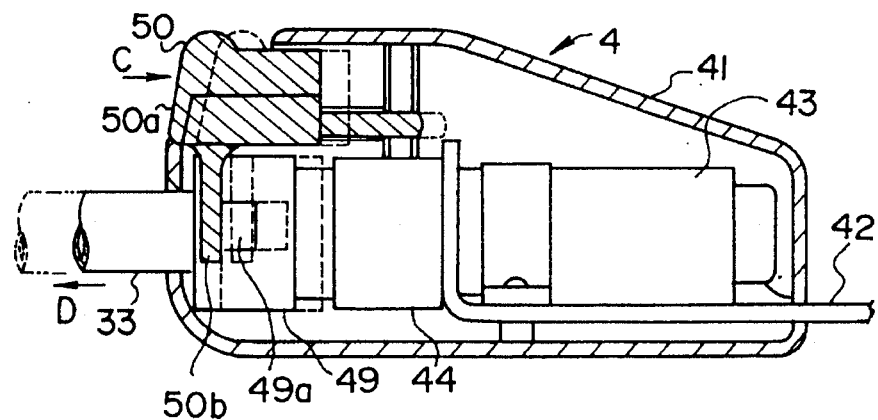
FIG. 14 is a vertical sectional view showing a releasing operation of the tongue by a press button of the buckle.
Figure 15:
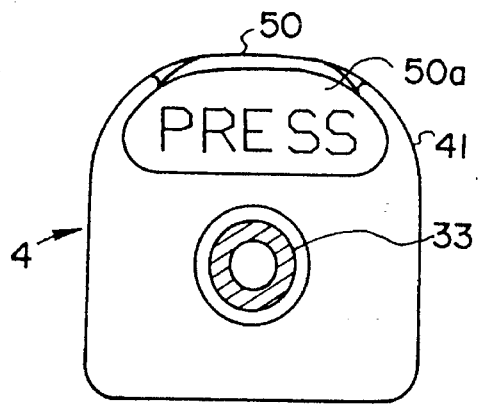
FIG. 15 is an end view showing a front face of the buckle.

FIGS. 13–15 are explanatory views showing an embodiment of the buckle. The buckle 4 supports fixedly the tongue pipe 33 and has the gas generating means disposed inside thereof to introduce the spouted gas form the gas generating means through the gas path 34 in the tongue pipe 33 to the inflatable portion 25.

The "coupling" between the buckle 4 and tongue 3 is achieved by engaging an annular groove 33b disposed on the peripheral surface of a distal end of the tongue pipe 33, to metal balls 47 inserted in tapered coupling holes 44a formed in the buckle 4, in which each of the metal balls 47 has a portion projecting from the inner surface of the coupling hole 44a.

In FIG. 13, numeral 41 designates a housing in which a portion of a flange plate 42 is fixed. The buckle 4 is secured to the flange plate 42 which is fixed to the floor of the vehicle (not shown). In the housing 41, a gas generator 43 as the gas generating means is fixed to the flange plate 42. The gas generator 43 is firmly connected to a buckle body 44 acting also as a gas passing pipe.

FIG. 13 shows a state of coupling the tongue pipe 33 to the coupling hole 44a. As shown in the figure, when the tongue pipe 33 is coupled to the coupling hole 44a of the buckle body 44, a tongue pipe releasing ring 45 is pressed against a biasing force of the spring 46 by the tongue pipe distal end 33a in a direction of the arrow A.

While, the tapered holes 44b are formed on a peripheral surface of the buckle body 44 at predetermined intervals. The metal ball 47 is inserted with allowance for moving from the peripheral surface side of the buckle body 44 to each of the tapered holes 44b so that the one portion of the metal ball 47 projects from the inner surface of the coupling hole 44a. When the tongue pipe 33 is coupled to the coupling hole 44a, each of the metal balls 47 is pressed from the peripheral surface side of the buckle body by releasing operation ring 49 biased by a spring 48 in a direction of the arrow B. Therefore, one portion of the metal ball 47 projects into the annular groove 33b disposed on the peripheral surface of the tongue pipe 33 to engage the annular groove 33b of the tongue pipe 33, so that the tongue pipe 33 is coupled and fixed inside of the coupling hole 44a.

While, release of the tongue pipe 33 is accomplished by pressing a press button 50 disposed on the housing in a direction of the arrow C as shown in FIG. 14.

The press button 50 is an operational button of a non-circular type and has a pressing face 50a directed toward an upper front position of the housing as shown in FIG. 15. Therefore, the occupant can operate the button 50 by one action.

The description will now be briefly made as regard to a mechanism of releasing the tongue 3 from the buckle 4.

As the press button 50 is pressed in the direction of the arrow C as shown in FIG. 14, a protuberance portion 49a of the release operational ring 49 is pressed by an operational arm 50b mounted on the press button 50 in the direction of the arrow C so that the release operational ring 49 slides against a biasing farce of the spring 48 in the direction of the arrow C to release the pressure of the metal ball 47 from the release operational ring 49. Therefore, the metal ball 47 becomes free so as to release the press fixing of the metal ball relative to the tubular groove 33b of the tongue pipe 33. As a result, the tongue pipe releasing ring 45 in the buckle body 44 is biased by a spring 46 in a direction of the arrow D to press out the tongue pipe 33 from the inside of the buckle body 44 and then the tongue 3 is released from the buckle 4.

Figure 16:
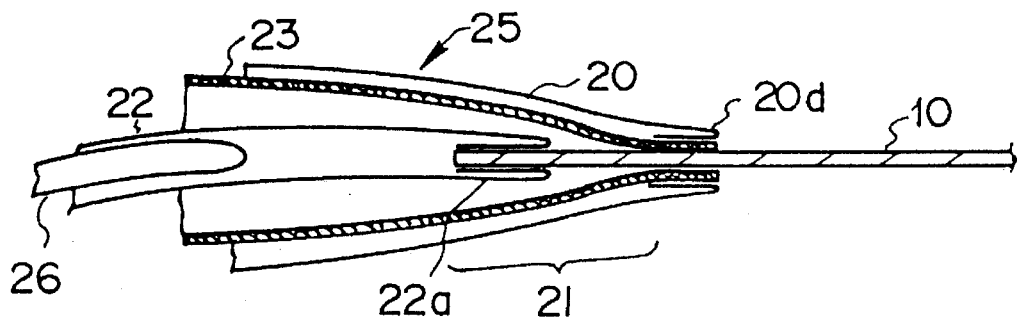
FIG. 16 is a partial longitudinal sectional view showing a structure of a slip guide side of the inflatable portion according to the second invention.
Figure 17A:
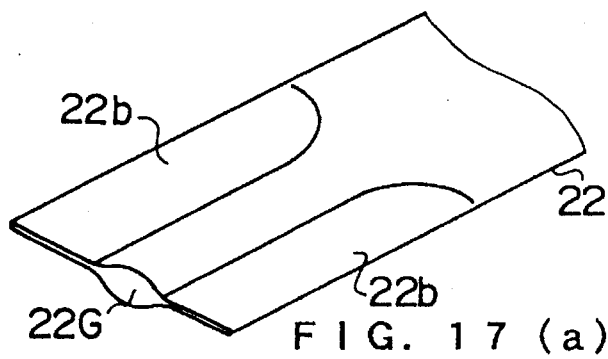
FIGS. 17 (a)–17 (c) are perspective views showing altered examples of members for restricting an inflation form of the inflatable portion according to the second invention.
Figure 17B:
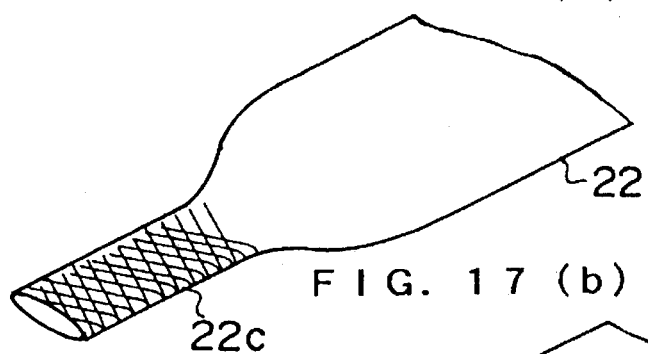
Figure 17C:
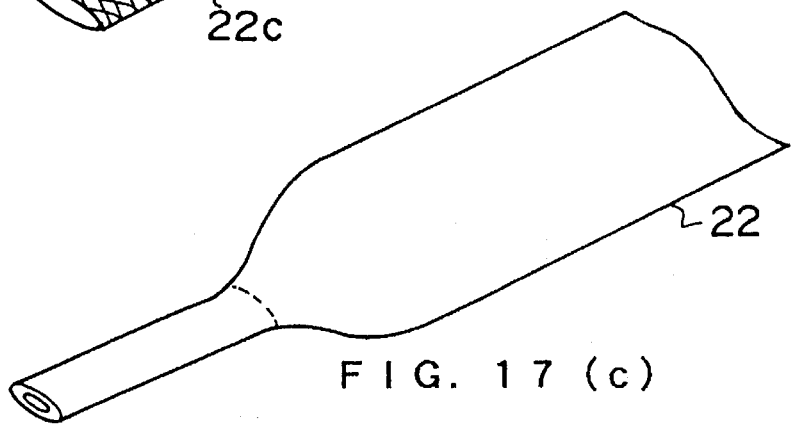

An embodiment of the second invention is now described referring to FIGS. 16 and 17.

FIG. 16 is a sectional view showing a sewing portion of the inflatable portion 25 near the slip guide side corresponding to FIG. 6 of the first embodiment.

The end of the tubular knitted textile shown in FIG. 16 is integrally glued to the end 20d of the cover 20 as in FIG. 6 and is firmly sewed to the predetermined position of the webbing 10. The end of the tube 22 made of silicone rubber is heat-sealed or glued to the inner belt 21 (it is also called the inner belt 21; because it is located inside the inflatable portion 25 as in the first invention.). The inner belt 21 is cut at a portion corresponding to the end 22a where the tube 22 made of silicone rubber is fixed. In the tube 22, only the cylindrical bag filter 26 for performing the same function as the bag filter as described in the first invention is accommodated.

In the inflatable seat belt apparatus structured in the manner according to the second invention, the inflatable portion 25 is operable as "webbing" at a weak crash which does not causes the gas generating means to work. That is, the inflatable portion 25 is expanded little in the longitudinal direction due to the characteristics of the knitted textile member 23 used therein so that the inflatable portion 25 receives a tensile force of the belt as well as a normal webbing and can restrain the occupant reliably.

The inflatable portion 25 is inflated in the proper shape at a crash as in the first invention so as to restrain the occupant for the wider area of the inflatable portion 25.

Furthermore, the inflatable portion 25 structured as mentioned above has no inner belt 21, so that the tube 22 made of silicone rubber may be modified as shown in FIGS. 17 (a)–(c).

FIG. 17 (a) shows an altered example in which the tube 22 is restricted by heat sealing or gluing except the gas path 22G.

FIG. 17 (b) shows an altered example in which the diameter near the gas inlet is reduced to approximately the same as the diameter of the gas path 22G, and the reinforcing thread 22c is then wound around the periphery of the tube 22.

FIG. 17 (c) shows an altered example in which the diameter near the gas inlet is reduced to approximately the same as the diameter of the gas path 22G, and the thickness of this portion is increased not to inflate during the gas introduction.

What is claimed is:

1. An inflatable seat belt for restraining movement of an occupant in a vehicle, comprising:

a webbing attached to the vehicle and extending for restraining movement of the occupant;

an inflatable portion fixed to the webbing and contacting the occupant when the webbing is worn, said inflatable portion including an elastic inflatable tube having an elongated shape and heat resistance, and fixed to the webbing; a knitted member in a flat form and connected at both longitudinal ends to the webbing to entirely cover the inflatable tube, said knitted member having elasticity in a direction perpendicular to a longitudinal direction of the webbing and non-elasticity in the longitudinal direction of the webbing; and a non-expandable cover for substantially completely covering the knitted member and having a joining portion extending along the longitudinal direction of the webbing without connecting to the knitted member, said joining portion having a first part corresponding to a chest of the occupant and at least one second part situated adjacent to the first part, said first part being weaker than the second part in strength;

a tongue fixed to the inflatable portion and having a gas flow path therein; and a buckle attached to the vehicle and engagable to the tongue, said buckle having a port to supply a gas to the inflatable portion through the gas flow path of the tongue so that when the inflatable tube is inflated by the gas, the knitted member expands laterally at the portion corresponding to the first part while breaking the first part, expansion of the knitted member being restricted by the second part.

2. An inflatable seat belt according to claim 1, wherein said first part is sandwiched between two second parts so that a center portion of the inflatable portion inflates.

3. An inflatable seat belt according to claim 2, wherein said inflatable portion further includes a filter attached to the gas flow path of the tongue, said webbing extending throughout the entire inflatable portion, and said elastic inflatable tube having an elongated shape and completely surrounding the webbing and the filter.

4. An inflatable seat belt according to claim 2, wherein said elastic inflatable tube has a shape corresponding to the webbing when the gas is not supplied and is made of silicone rubber.

5. An inflatable seat belt according to claim 4, wherein said inflatable portion further includes an end fitting situated inside the filter and a caulking fitting situated over the cover to sandwich the filter, the inflatable tube, the knitted member and the cover therebetween, said tongue passing through the end fitting and the caulking fitting.

6. An inflatable seat belt according to claim 2, wherein said inflatable portion further includes a filter attached to the gas flow path of the tongue, said webbing being fixed at one end to the filter, the inflatable tube, the knitted member and the cover without entirely extending throughout the inflatable portion.

7. An inflatable seat belt according to claim 6, wherein said elastic inflatable tube has a shape corresponding to the webbing when the gas is not supplied and is made of silicone rubber.

* * * * *